The specification in this patent is not in print.
8189X
N. Wyeth,
Bread Machine,
Patented May 12, 1834
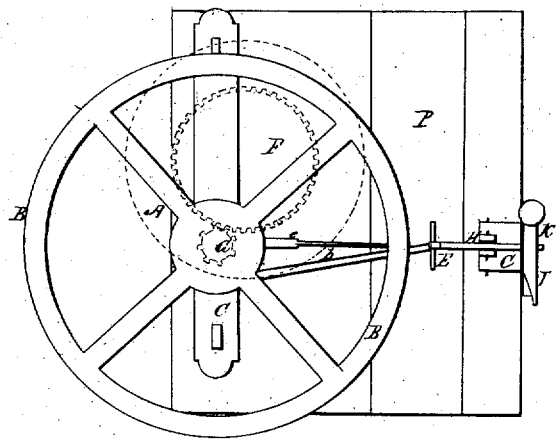
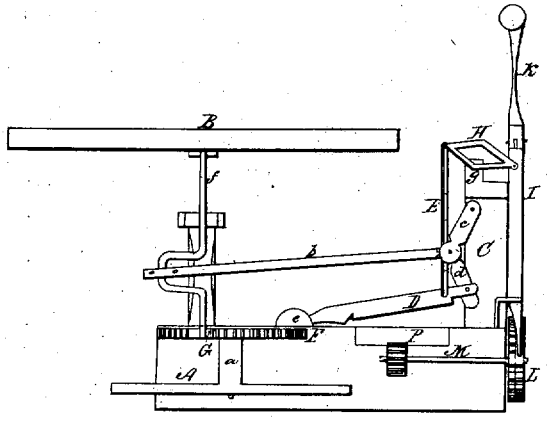
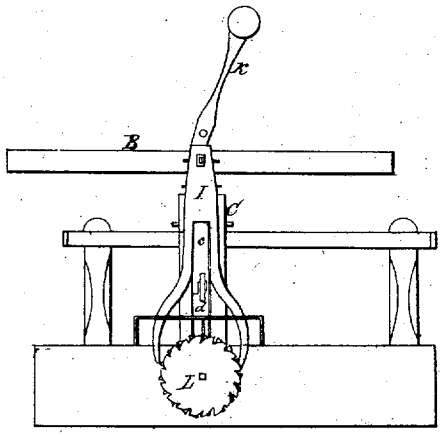

ar. 13

May 12. 1834

Noah Wyeth. Hingham. Mass. 8189X

Letters Patent May 12. 1834.

The Schedule referred to in these Letters Patent and making part of
the same containing a description in the words of the said Noah Wyeth
himself of his improvements in machinery for more thoroughly incorpora
ting the substances used in the composition of Bread —
To all persons to whom these Presents shall come. Noah Wyeth
of Hingham in the County of Plymouth and State of Massachusetts
Baker sends Greeting — Be it known that I the said Noah Wyeth
have invented constructed made and applied to use certain improvements of
machinery to be used for the purpose of more thoroughly incorporating the
substances employed in making bread and expediting the process of rolling
out the dough which invention I have hereunto described and set forth
in connection with the drawings attached which taken together form
my specification — A represents a circular platform placed hor
izontally and turning on a vertical shaft. a. passing through its
centre. Said platform is furnished with small cleats affixed around
its outer edge for the feet of a horse or other animal used for the pur
pose to act against and give motion to the machinery. F is a
cogged wheel on the shaft. a. made of a proper size and material, the
teeth of which engage with and act on the teeth of a pinion G on the
upright vertical shaft f. The shaft f turning at its top and bottom
in proper boxes or supports is bent in the form of a bell crank in the
centre and has on the top or in any other convenient part of it a fly
wheel B. to regulate its motions — This crank part of the shaft has con
nected with it the end of a long pitman b in any convenient or prop
er manner. the said pitman b receives a backward and forward
motion by the rotation of the crank and acts at its opposite extremi
ty on the two toggle joints c. d. which during a revolution of the
crank are brought into straight line [illegible]. The upper end of the
toggle c. is connected by a joint to the frame work e. which the

RB,

8189X lower end of its opposite toggle d. is attached by a joint to the stamper
D and the movements of these toggles to and fro alternately raise and
depress the said stamper D. The stamper D vibrates in a proper bear
ing or guageon at its other end. e. as seen in the drawing. E is an upright
bar of iron or suitable material with an opening in the centre to
admit the passage through and horizontal movements of the pitman.
The said bar E is connected at its foot f. and turns upon a pin or bolt
in a convenient part of the stamper D while it is attached and turns
at its top by a similar pin or bolt to the end of the lever beam H.
turning on bearings or journals on the top of the frame work C at
g. This lever beam H has its other extremity attached by a joint to the
forked pull I shaped as seen in the figures or otherwise properly made —
This pull I is moved upwards and downwards by the vibratory action
of the lever beam H. On the top of the pull and connected to it by
a joint is a governor or rod K having a weight on its end. This
weight can be inclined at an equal angle on each side of the perpendicular
and as it is thrown either to the right or left its weight acts to bear one of
the forks against the double ratchet wheel L which it moves round dur
ing its rectilinear motions upwards and downwards. The double ratchet
wheel L is composed of two wheels, the teeth of whose circumferences are set
in opposite directions, that is to say, those on the outer are acted on by
the left fork of the pull while those on the inner receive the right fork
which is bent inwards to play in them. The Wheel L is fixed on the
shaft M. which shaft M. revolving in proper journals + boxes has
on its other extremity a cog pinion O which plays into a cogged
rack attached to the underside of the moveable platform P slid
ing on friction rollers or otherwise properly supported during its passage
to and fro. — The dough being placed on the platform and the machinery
put in motion by animal or other force — the power is communica
ted from the cog wheel E to the pinion G in the shaft I from thence
by means of the pitman b to the toggles c d which are alternately brought
into a straight line with each other and caused to depart from the
same thereby raising and depressing the stamper D the lower edge of which is shaped like a blunt wedge to press the dough asunder as it
is brought down upon it. By the intervention of the bar E. the lever beam
H and forked pull I acting together the motion of the stamper D
turns the ratchet wheel L. its shaft M and pinion O moving the
platform a proper distance to present to the lower edge of the stamp-
er D a fresh portion of the dough to be separated at every stroke
of it downwards — When the dough has been acted [illegible] on throughout
it is doubled up by the attendant who throws ~~up~~ the governor K
to the opposite side when the other fork of the pull is brought to act in
the ratchet wheel and reverses the movement of the platform P and
brings the dough under the influence of the stamper D and so on until
it is sufficiently rolled for the purpose of baking

What I claim as new and my invention is the application of toggle
joints to the stamper D and the combination of machinery for moving
the platform P for accomplishing the above purpose of more thorough
ly incorporating the articles used in the composition of bread

In testimony that the above is a true specification of my said
invention I have hereunto set my hand this nineteenth day of April
in the Year of our Lord eighteen hundred and thirty four.

Witnesses
Robert H Eddy }
W E Prescott } Noah. Wyeth.

Drawing 1079 rds

E.4
CKSW.